C. W. SNEIDER.
Breech-Loading Fire-Arm.

No. 202,126. Patented April 9, 1878.

Witnesses
J. J. Masson
D. P. Cowl

Inventor:
Charles W. Sneider,
by E. E. Masson
atty

UNITED STATES PATENT OFFICE.

CHARLES W. SNEIDER, OF BALTIMORE, MARYLAND.

IMPROVEMENT IN BREECH-LOADING FIRE-ARMS.

Specification forming part of Letters Patent No. 202,126, dated April 9, 1878; application filed February 13, 1878.

*To all whom it may concern:*

Be it known that I, CHARLES W. SNEIDER, of Baltimore, in the county of Baltimore and State of Maryland, have invented certain new and useful Improvements in Breech-Loading Fire-Arms; and that the following is a full, clear, and exact description of the same, reference being had to the accompanying drawings, making a part of this specification, in which—

Figure 1:
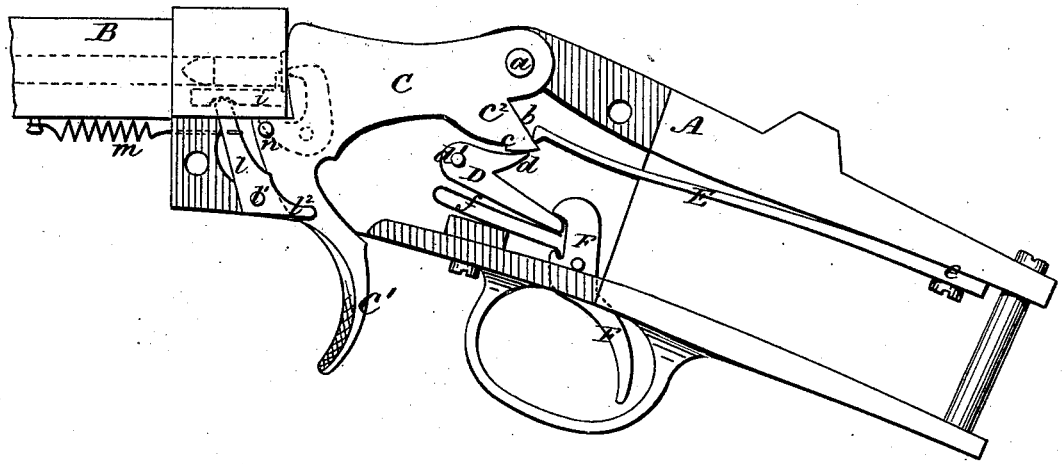
Figure 2:
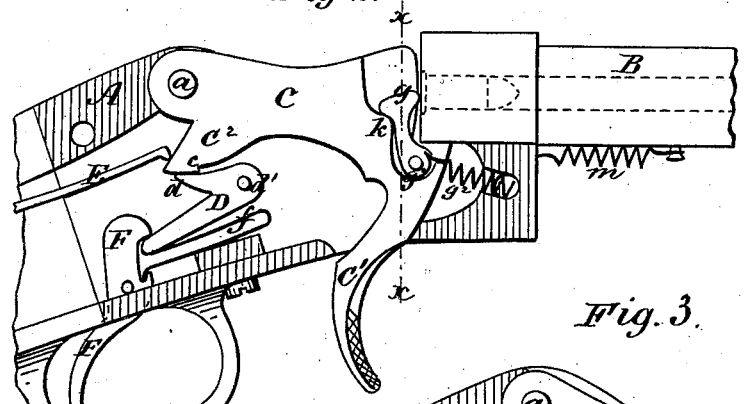
Figure 4:
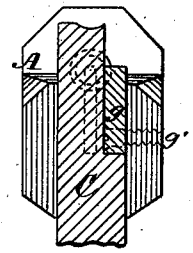
Figure 3:
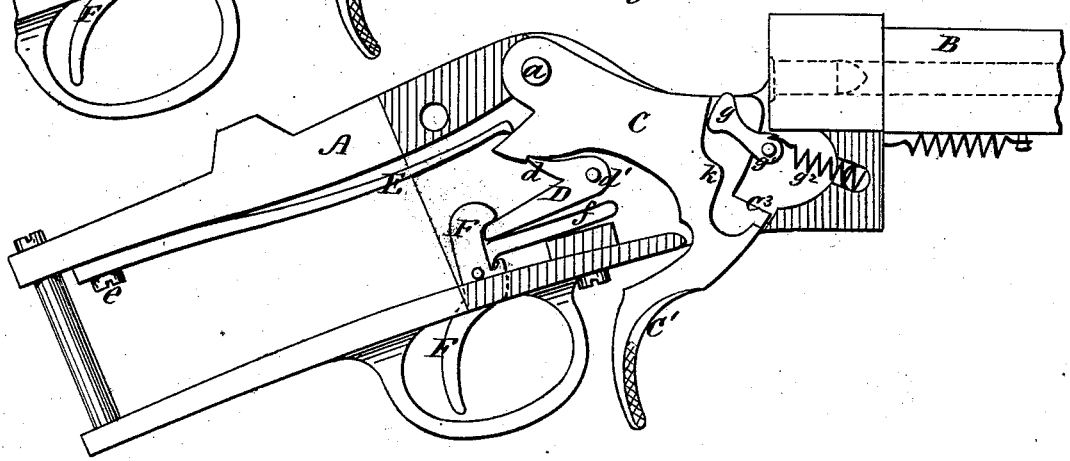

Figure 1 represents a side view of the fire-arm, with the left-side plate removed. Fig. 2 represents a side view, with the right-side plate or frame removed and the barrel closed by the breech-block. Fig. 3 represents the same, with the barrel open and breech-block down. Fig. 4 represents a transverse section on line $x\ x$ of Fig. 2.

My invention relates to breech-loading fire-arms, and is intended mainly for light arms of small caliber, although it may be used with arms having the ordinary calibers.

My invention consists in combining with breech-loading fire-arms a breech-block formed in one piece, with an extension, handle, or finger-piece projecting through the under side of the frame, by means of which the breech-block can be lowered to open the barrel, introduce a cartridge into, or extract a cartridge-shell from, the barrel.

It also consists in the combination, with the breech-block formed in one piece, with an extension or finger-piece, as above mentioned, of a cartridge-shell extractor and lever, operated by the said breech-block in its downward motion, as will be described.

It also consists in the combination, with a breech-block hinged at the rear, of a striker or cartridge-exploder pivoted to the frame, and thrown forward by the breech-block in its upward motion to close the breech by a projection or shoulder formed on the breech-block.

It also consists in the combination of a breech-block formed in one piece, with an extension or finger-piece, with a mainspring, a spring-sear, and trigger, by which it is operated and released, as will be more fully described.

In the accompanying drawings, A represents the frame, to which the stock can be attached; and B, the barrel, united to the frame. C represents the breech-block, pivoted to the frame at $a$. It has formed with it, in one piece, the extension $C^1$, on its under side, that is used as a handle or finger-piece to depress or lower the breech-block when it is desired to open the rear of the barrel. Its rear portion is made in the form of a segment at $C^2$, provided with one or more notches, $c$, into which the angular extremity $d$ of the sear D can enter to keep the breech-block open. The rear of the breech-block is cut away above the segment $C^2$, so as to form a shelf or projection, $b$, upon which the front end of the mainspring E rests, the latter being secured to the frame at $e$. The sear is pivoted to the frame at $d'$. It is forced upward against the segment $C^2$ of the breech-block by a spring, $f$, placed under it. The striker $g$ is pivoted to the frame at $g'$. There is a recess formed in the breech-block for its reception. Its striking end is thrown forward during or near the end of the upward motion of the breech-block by the projection $k$ (forming the rear of the recess) pressing against the back of the striker; and when the breech-block is depressed the striker is thrown backward by a spring, $g'$, located as shown, or otherwise. This striker, as indicated in full lines in the drawings, Figs. 2 and 3, is intended for rim-priming cartridges, but it can be made to fire central-priming cartridges by striking against a plunger in the center of the breech-block; or the striker itself can be made bell-crank form, as indicated in dotted lines, Fig. 1, located centrally in the breech-block, and pivoted to it, so that its lower arm may strike the under side of the barrel before the breech-block reaches its seat.

The cartridge-shell extractor $i$ (shown by dotted lines, Fig. 1) is placed, as usual, parallel and adjacent to the bore of the barrel; it is operated by a bell-crank lever, $l$, pivoted to the frame at $l^1$. The upper end of this lever engages with a notch formed in the under side of the extractor, and a retractile spring, $m$, is attached to it to keep the extractor within its casing. The extractor is operated by depressing the breech-block beyond the full-cock notch; the stud $n$ on the side of the breech-block will then depress the lower end $l^2$ of the bell-crank lever, and bring the extractor out to throw a cartridge-shell from the barrel. The forward end of the breech-block has a shoulder, $C^3$, that engages under the barrel and arrests its motion when thrown upward by the action of the mainspring. Its extension $C^1$ can be protected by a guard as well as the trigger.

Having thus fully described my invention, I claim—

1. In combination with breech-loading fire-arms, a breech-block hinged in line with the bore, and provided with a shelf, $b$, to receive the front end of the mainspring, by which it is actuated, said breech-block being formed in one piece with an extension, handle, or finger-piece at the front, projecting through the under side of the frame, by means of which the front of the breech-block can be depressed to cock the fire-arm or to open the barrel, introduce a cartridge in, or extract a cartridge-shell from, said barrel, substantially as described.

2. In combination with a breech-block formed in one piece, with an extension or finger-piece, as described, a cartridge-shell extractor and bell-crank lever, operated by the said breech-block in its downward motion, substantially as described.

3. In combination with a breech-block hinged at the rear, a striker or cartridge-exploder pivoted to the frame and thrown forward by the breech-block in its upward motion, to close the breech by a projection or shoulder formed on the breech-block, substantially as and for the purpose set forth.

4. The combination of a breech-block formed in one piece, with an extension or finger piece, $C^1$, a segment, $C^2$, and shoulder $C^3$, with a mainspring, a spring-sear, and trigger, by which it is operated and released, substantially as described.

5. In combination with a breech-block formed with an extension or finger piece projecting under the frame, as described, a cartridge-exploder pivoted to the frame to strike upon the rim of the cartridge, and a cartridge-exploder pivoted to the breech-block to strike upon the center of the cartridge, both operated by the breech-block in its upward motion, substantially as described.

CHARLES W. SNEIDER.

Witnesses:
   JAMES T. WILHELM,
   MORRIS LENZBERG.